United States Patent
Dhanabalan et al.

(10) Patent No.: US 11,595,428 B2
(45) Date of Patent: Feb. 28, 2023

(54) APPLICATION SECURITY THREAT AWARENESS

(71) Applicant: Citrix Systems, Inc., Ft. Lauderdale, FL (US)

(72) Inventors: Preveen Raja Dhanabalan, Bangalore (IN); Anuj Magazine, Bangalore (IN); Anudeep Athlur, Bangalore (IN)

(*) Notice: Subject to any disclaimer, the term of this patent is extended or adjusted under 35 U.S.C. 154(b) by 143 days.

(21) Appl. No.: 17/142,743

(22) Filed: Jan. 6, 2021

(65) Prior Publication Data

US 2022/0217174 A1  Jul. 7, 2022

(51) Int. Cl.
| | | |
|---|---|---|
| H04L 9/40 | (2022.01) | |
| G06F 9/451 | (2018.01) | |
| G06T 11/00 | (2006.01) | |
| H04L 43/028 | (2022.01) | |
| G06F 9/445 | (2018.01) | |

(52) U.S. Cl.
CPC ...... H04L 63/1433 (2013.01); G06F 9/44526 (2013.01); G06F 9/451 (2018.02); G06T 11/00 (2013.01); H04L 43/028 (2013.01)

(58) Field of Classification Search
CPC .............. H04L 63/1433; H04L 43/028; G06F 9/44526; G06F 9/451; G06T 11/00
See application file for complete search history.

(56) References Cited

U.S. PATENT DOCUMENTS

| | | | |
|---|---|---|---|
| 9,659,182 B1* | 5/2017 | Roundy | G06F 21/44 |
| 10,893,059 B1* | 1/2021 | Aziz | G06F 21/53 |
| 2005/0160286 A1* | 7/2005 | Currie | H04L 63/1433 726/22 |
| 2006/0253458 A1* | 11/2006 | Dixon | H04L 63/1483 |
| 2010/0005291 A1* | 1/2010 | Hulten | G06F 21/51 713/188 |
| 2012/0317645 A1* | 12/2012 | Fortier | G06F 21/566 726/24 |
| 2013/0014020 A1* | 1/2013 | Dixon | H04L 63/1441 715/738 |
| 2013/0318613 A1* | 11/2013 | Archer | G06F 21/577 726/25 |
| 2017/0344750 A1* | 11/2017 | Ekambaram | G06F 21/45 |
| 2020/0106799 A1* | 4/2020 | Sauve | H04L 63/1433 |
| 2020/0153850 A1* | 5/2020 | Krishnan | H04L 63/101 |
| 2020/0245134 A1* | 7/2020 | Kaczynski | G06F 21/554 |
| 2020/0382470 A1* | 12/2020 | Butler | G06F 21/554 |
| 2021/0064758 A1* | 3/2021 | Zettel, II | G06F 21/577 |
| 2021/0203687 A1* | 7/2021 | Rabin | H04L 63/20 |

* cited by examiner

*Primary Examiner* — Hien L Duong

(57) ABSTRACT

A method for providing a visual indication of the security threat awareness level is disclosed. Such a visual indication helps improve the security of a device or an enterprise by giving a user an indication of the security risks associated with currently open and active applications. In turn, the user can use the visual indication as a cue to take mitigating actions to reduce the security risk, such as by using the application more carefully or by exiting the application. Each application is assigned a security score and the system determines the security threat awareness level based on the security score(s) of the open and active applications.

20 Claims, 9 Drawing Sheets

APPLICATION SECURITY THREAT AWARENESS

BACKGROUND

To protect computing devices from security threats, enterprises typically deploy security solutions such as firewalls, intrusion prevention systems (IPS), or intrusion detection systems (IDS). To protect remotely connected devices, enterprises typically deploy Virtual Private Networking (VPN) solutions that enable those devices to connect to the enterprise network securely. For security reasons, enterprises can further implement backhauling policies to force network traffic from remote devices to pass through the enterprise so that the enterprise has complete visibility of the traffic and can maintain security as needed to identify security threats. A problem with backhauling is that a high volume of traffic, also including unofficial/non-work-related traffic, can hit the enterprise network. This high volume of traffic can cause enormous stress on the enterprise's network infrastructure. Moreover, performing IPS/IDS on such traffic may be costly for the company. Further, these solutions can adversely affect or slow down other critical business applications. Therefore, there remain non-trivial problems associated with protecting devices from security threats.

SUMMARY

One example provides a method for providing security threat awareness to a user. The method includes detecting an open application executing on a client computing device based on an entry in an operating system process table of the client computing device; obtaining a security score associated with the open application; and causing a graphical user interface of the client computing device to superimpose a visual indication of the security score over a portion of an output of the open application using a color and/or a numeric value, the visual indication representing at least one of a plurality of security threat levels corresponding to the security score.

At least some examples of the method include one or more of the following. Where the open application is a first open application, the entry is a first entry, and the security score is a first security score, the method further includes detecting a second open application executing on the client computing device based on a second entry in the operating system process table; obtaining a second security score for the second open application; and calculating an average security score of the first security score and the second security score, and/or a lowest of the first security score and the second security score, where the visual indication further represents at least one of the security threat levels corresponding to the average security score or the lowest of the first security score and the second security score. Where the color is a first color, the numeric value is a first numeric value, and the visual indication is a first visual indication, the method further includes causing the graphical user interface to display a second visual indication of the first security score and/or the second security score using a second color and/or a second numeric value. Where a plugin software component is associated with the open application, detecting the open application includes identifying the plugin software component in the operating system process table. Detecting the open application includes inspecting network packets on a network connection associated with the open application for network activity generated by the open application. Where the security score is a first security score, the entry is a first entry, the color is a first color, the numeric value is a first numeric value, and the visual indication is a first visual indication, the method includes detecting an active application executing on a client computing device based on a second entry in the operating system process table, the active application being different from the open application; obtaining a second security score associated with the active application; and causing the graphical user interface to superimpose a second visual indication of the second security score over a portion of an output of the active application and/or the portion of the output of the open application using a second color and/or a second numeric value, the second visual indication representing at least one of the security threat levels corresponding to the second security score. Detecting the active application is further based on a process activity level associated with the entry in the operating system process table.

Another example provides a computer program product including one or more non-transitory machine-readable mediums having instructions encoded thereon that when executed by at least one processor cause a process to be carried out. The process includes detecting an active application executing on a client computing device based on a process activity level associated with an entry in an operating system process table of the client computing device and/or a volume of network traffic associated with the entry; obtaining a security score associated with the active application; and causing a graphical user interface of the client computing device to superimpose a visual indication of the security score over a portion of an output of the active application using a color and/or a numeric value, the visual indication representing at least one of a plurality of security threat levels corresponding to the security score.

At least some examples of the computer program product include one or more of the following. Where the entry is a first entry and the security score is a first security score, the process further includes detecting an open application executing on the client computing device based on a second entry in the operating system process table, the open application being different from the active application; obtaining a second security score for the open application; and calculating an average security score of the first security score and the second security score, and/or a lowest of the first security score and the second security score, where the visual indication further represents at least one of the security threat levels corresponding to the average security score or the lowest of the first security score and the second security score. Where the color is a first color, the numeric value is a first numeric value, and the visual indication is a first visual indication, the process further includes causing the graphical user interface to superimpose a second visual indication of the first security score and/or the second security score over a portion of an output of the open application and/or the portion of the output of the active application using a second color and/or a second numeric value. Where the active application is executing independently of the open application, the visual indication further represents at least one of the security threat levels corresponding to the average security score. Where the active application is executing non-independently from the open application, the visual indication further represents at least one of the security threat levels corresponding to the lowest of the first security score and the second security score. Where the active application is a personal application and the open application is a business application, the visual indication further represents at least one of the security threat levels corresponding to the lowest of the first security score and the second security score. Detecting the active application includes inspecting network packets on a network connection associated with the active application for network activity generated by the active application.

Another example provides a system including a storage and at least one processor operatively coupled to the storage. The at least one processor is configured to execute instructions stored in the storage that when executed cause the at least one processor to carry out a process including detecting an open application executing on a client computing device based on a first entry in an operating system process table of the client computing device; obtaining a first security score associated with the open application; detecting an active application executing on the client computing device based on a second entry in the operating system process table; obtaining a second security score associated with the active application; and causing a graphical user interface of the client computing device to superimpose a visual indication of at least one of the first security score and the second security score over a portion of an output of the open application and/or a portion of an output of the active application using a color and/or a numeric value, the visual indication representing at least one of a plurality of security threat levels corresponding to the at least one of the first security score and the second security score.

At least some examples of the system include one or more of the following. The process further includes detecting a second active application executing on the client computing device based on a third entry in the operating system process table; obtaining a third security score for the second active application; and calculating an average security score of the first security score, the second security score, and the third security score, and/or a lowest of the first security score, the second security score, and the third security score, where the visual indication further represents at least one of the security threat levels corresponding to the average security score or the lowest of the first security score, the second security score, and the third security score. Where the color is a first color, the numeric value is a first numeric value, and the visual indication is a first visual indication, the process further includes causing the graphical user interface to superimpose a second visual indication of the first security score and/or the second security score over the portion of the output of the open application and/or the portion of the output of the active application using a second color and/or a second numeric value. Where a plugin software component is associated with the open application, detecting the open application includes identifying the plugin software component in the operating system process table. Detecting the open application includes inspecting network packets on a network connection associated with the open application for network activity generated by the open application. Detecting the active application is further based on a process activity level associated with the second entry in an operating system process table of the client computing device and/or a volume of network traffic associated with the second entry.

Other aspects, examples, and advantages of these aspects and examples, are discussed in detail below. It will be understood that the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
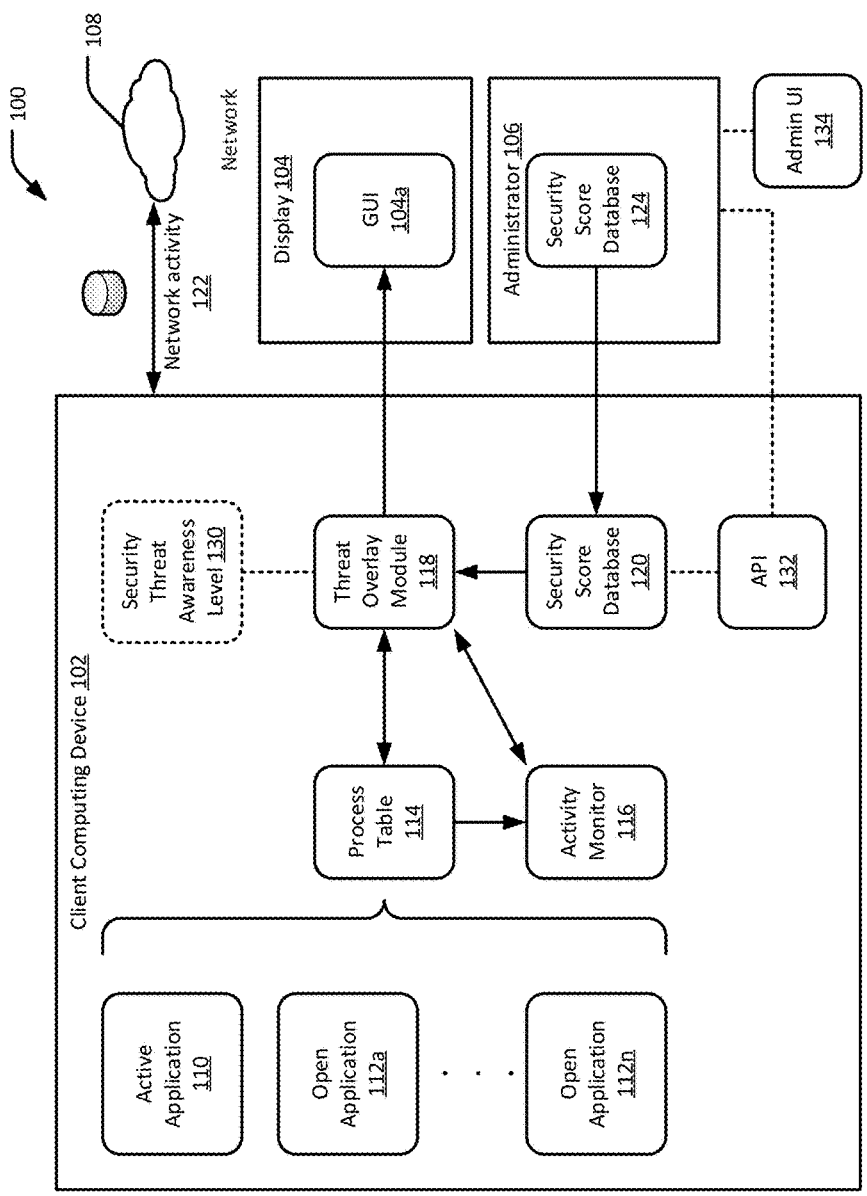
FIG. 1 is a block diagram of an application security threat awareness system, in accordance with an example of the present disclosure.

As summarized above, at least some examples described in this disclosure are directed to techniques for providing a visual indication of an application security threat score. Such a visual indication helps improve the security of a device or an enterprise by giving a user an indication of the security risks associated with currently open and active applications executing on a client computing device that is remotely connected to an enterprise environment. In turn, the user can use the visual indication as a cue to take mitigating actions to reduce the security risk, such as by using the application more carefully, including avoiding clicking on unknown or unverified hyperlinks, or by exiting the application. Each application is assigned a security score and the system determines the application security threat score based on the security score(s) of the open and active applications.

As noted above, enterprises can deploy security solutions including IPS, IDS, VPN, backhauling, and application blocking to mitigate security risks associated with devices that remotely connect to the enterprise. For example, the enterprise may choose to block personal applications when a remote user is connected through VPN. However, this may be not a viable solution for all companies. For example, employees may learn many relevant/useful work-related skills by browsing the Internet, which would otherwise be not possible. Furthermore, such security-related restrictions can have a directly adverse impact on the workspace user experience, for instance, by creating hurdles to accessing information and performing work-related tasks. Thus, to address this, typically enterprises set policies on the remote VPN client such that only the business traffic is directed to the VPN tunnel, and the rest of the traffic breaks out directly to the Internet, which increases the security risk to the client. In such cases, enterprises recommend polices to install security software's such as anti-virus and anti-malware software. In addition, enterprises may also recommend web security software that gives a rating on the security aspects of the website the user is browsing.

However, while these solutions reduce the security threat space, the weakest link in the security chain is the human element—employees may unintentionally induce some security threats to the company. For example, when a user clicks a link in one of his personal emails, which is trusted by web advisors and anti-virus software, the user is prone to phishing attacks that can compromise an active session related to work (such as getting an access to the employee's company domain account and resetting the password) or may even compromise the entire device using a reverse shell.

To this end, example embodiments of the present disclosure provide real-time employee security awareness based on currently open and/or active applications on the client device. The user is provided with an awareness threat level indication, which the user can use as a guide for mitigating security risks to the device. The indication alerts the user to be more careful while taking any actions in the application (such as clicking a link on the web or opening a link through mail) when the security score is low, corresponding to a high security risk. Sometimes, it is possible that the user has already taken an action, and then looks at the indication. A low score in the security indicator can still help the user to review the action he just took, and if he is vulnerable, he can contact the security team immediately. Further, a log can be provided for which applications are lowering the application security threat score of the client computing device so that the user can close unnecessary applications to mitigate security risk. Such logs/reports may also be shared with the enterprise administrators for further evaluation and mitigation actions. Various examples will be apparent in view of the present disclosure.

Example Application Security Threat Awareness System

FIG. 1 is a block diagram of an application security threat awareness system 100, in accordance with an example of the present disclosure. The system 100 includes a client computing device 102, a display device 104, an administrator 106, and a communication network 108. The client computing device 102 is configured to execute one or more active applications 110 and one or more open applications 112a-n. For example, the active and open applications 110, 112a-n can include an email application, a word processing application, a spreadsheet application, a multimedia application, a virtual desktop application, or any application that can be executed by the client computing device 102. The active and open applications 110, 112a-n can include business applications and personal applications. A business application is an application that is approved and installed/configured for a user by an administrator or other entity, while a personal application is any application that is not a business application. Examples of business applications include Citrix Virtual Apps & Desktops (CVAD), Office365, and Google Chrome, which can be applications for which security scores have been assigned by the administrator. Examples of personal applications include Google Gmail, YouTube, and Dropbox, which can be applications for which security scores have been assigned by the administrator or applications having no security score (default value of zero).

During execution by the client computing device 102, each of the applications is referred to in this disclosure as active and/or open. The active application 110 is the application currently in use by a user. For example, the active application 110 is an application that is currently executing in the foreground of a user interface such that the user is able to directly interact with the application via the user interface. By contrast, the open application 112a-n is any application that is currently executing (for example, the open application is running in the background). The one or more open applications 112a-n can be but are not necessarily the active application 110 (that is, active applications are also open applications, but open applications are not necessarily active applications). In some examples, the applications 110, 112a-n can be independent or non-independent. An independent application is an application that does not execute other applications, and a non-independent application is an application that executes other applications. For example, a web browser application and a virtual desktop application are independent applications, but applications executing within the web browser or virtual desktop are non-independent applications because the web browser and virtual desktop are each configured to execute other applications, such as video players, file managers, messaging services, etc. within the browser or virtual desktop.

The client computing device 102 further includes a process table 114, an activity monitor 116, a threat overlay module 118, and a security score database 120. The process table 114 is a list of the active and open applications 110, 112a-n as provided by a multitasking operating system of the client computing device 102. Examples of the multitasking operating system include Microsoft WINDOWS®, MacOS®, UNIX-based operating systems, and the like. The process table 114 includes information about the active and open applications 110, 112a-n such as: entries defining the state of the application (e.g., active or open); the processor, memory, network, or other resources used by the application; the name of the application; an amount (such as rate or volume) of processor, memory, and/or network usage or activity associated with the application; and other identifying information about the application.

The activity monitor 116 is a separate process configured to determine which applications 110, 112a-n are active or open based at least in part on information in the process table 114. For example, the activity monitor 116 can determine, in real time, the currently open applications 112a-n and the currently active application 110 based on processor, memory, and/or network resource usage, or the state of the application as provided by the process table 114, as will be described in further detail below.

The threat overlay module 118 determines a security threat awareness level 130 for the active application 110 and/or the one or more open applications 112a-n based at least in part on the process table 114, the activity monitor 116, the security score database 120, and or other information such as network activity 122 between the client computing device 102 and the network 108. For example, the threat overlay module 118 is configured to obtain a security score associated with the active application 110 and/or the one or more open applications 112a-n from the security score database 120 and cause a graphical user interface (GUI) 104a of the client computing device to display a visual indication of the security threat awareness level 130 using a color and/or a numeric value, such as described in further detail with respect to FIGS. 2 and 3. In some examples, the threat overlay module 118 can perform calculations to determine the security threat awareness level 130 using the security scores of multiple applications, such as calculating the average security score associated with all or some of the applications or the lowest security score associated with all or some of the applications. The visual indication represents at least one of a plurality of security threat levels corresponding to the security threat awareness level 130 and can be used by the user to mitigate a security risk associated with the active application 110 and/or the one or more open applications 112a-n.

The security score database 120 includes a database of security scores assigned to a set of applications including the active application 110 and the one or more open applications 112a-n. In some examples, the security score database 120 is a local copy of a primary security score database 124 that is created and maintained by the administrator 106 for use by the client computing device 102. The security scores are, in some examples, numeric values between 0 and 100, where applications assigned lower values represent higher security risks than applications assigned higher values. It will be understood that other scoring or rating schemes can be used, such as those that use different numeric scales or those that use higher values to represent higher security risks. As noted above, the security scores for the active application 110 and the one or more open applications 112a-n are used by the threat overlay module 118 to determine the security threat awareness level for the client computing device 102. The security threat awareness level and/or the security scores for the individual applications are displayed to the user as the visual indication in the GUI 104a of the display device 104. In some examples, the administrator 106 can designate the application 110, 112a-n as independent or non-independent in a security score database 120, 124.

In some examples, components of the client computing device 102, including the process table 114, the activity monitor 116, the threat overlay module 118, and the security score database 120, 124, are granted high priority with superuser or administrative privileges so that the user cannot pause, halt, or otherwise interrupt operation of these components. In some examples, the system 100 includes an Application Programing Interface (API) 132. The API 132 can be used by the client computing device 102 to synchronize the local copy of the security score database 120 with the remote copy of the security score database 124 on demand (as needed), periodically, or in real time. In some examples, an Administrator User Interface (Admin UI) 134 is configured to enable the administrator to assign security scores to the applications 110, 112a-n, and to monitor logs or other performance data associated with the client computing device 102, such as the active application 110, the one or more open applications 112a-n, and the security threat awareness level 130 as determined by the threat overlay module 118.

Example Visual Indication in Threat Overlay

Figure 2:
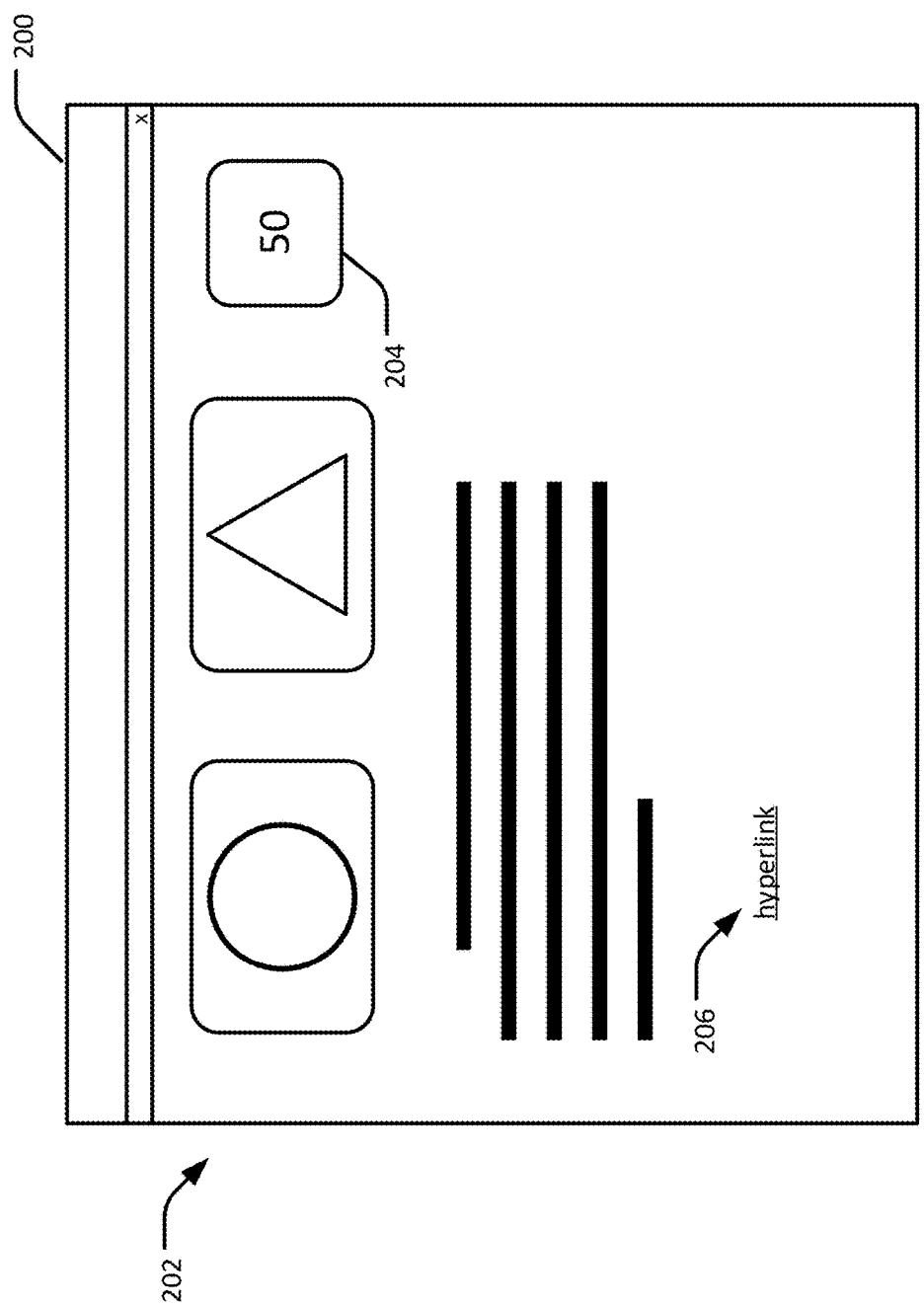
FIG. 2 is an example graphical user interface (GUI) for providing a visual indication of an application security threat awareness level, in accordance with an embodiment of the present disclosure.

FIG. 2 is an example GUI 200 for providing a visual indication of the security threat awareness level 130, in accordance with an embodiment of the present disclosure. The GUI 200 provides an output 202 of the active application 110 and a threat awareness overlay 204 that is superimposed over a portion of the output 202, such as shown. The threat awareness overlay 204 is a visual indication representing one of a plurality of security threat awareness levels corresponding to the security score of the active application 110, the open application 112a-n, and/or the security threat awareness level 130 for the client computing device 102. The threat awareness overlay 204 can, for example, include a numeric value corresponding to the security threat awareness level, such as high, moderate, or low, a numeric value corresponding to the security score of the active application 110 and/or the open application 112a-n, and/or a numeric value corresponding to the security threat awareness level 130 for the client computing device 102. In some examples, the threat awareness overlay 204 can include a color icon alone or in combination with the numeric value(s), such as red for a high security threat level, yellow for a moderate security threat level, and green for a low security threat level. By causing the GUI 200 to display the threat awareness overlay 204, the user can immediately see the visual indication and respond by taking actions to mitigate the security threat associated with the active application 110 and/or the open application 112a-n. For example, if the threat awareness overlay 204 indicates a high security risk, the user can mitigate the risk by closing the active application 110 and/or the open application 112a-n, or by using the applications more carefully in conjunction with a prescribed policy to reduce the risk (such as by avoiding clicking on unverified or unfamiliar hyperlinks 206 in the output 202).

Figure 3:
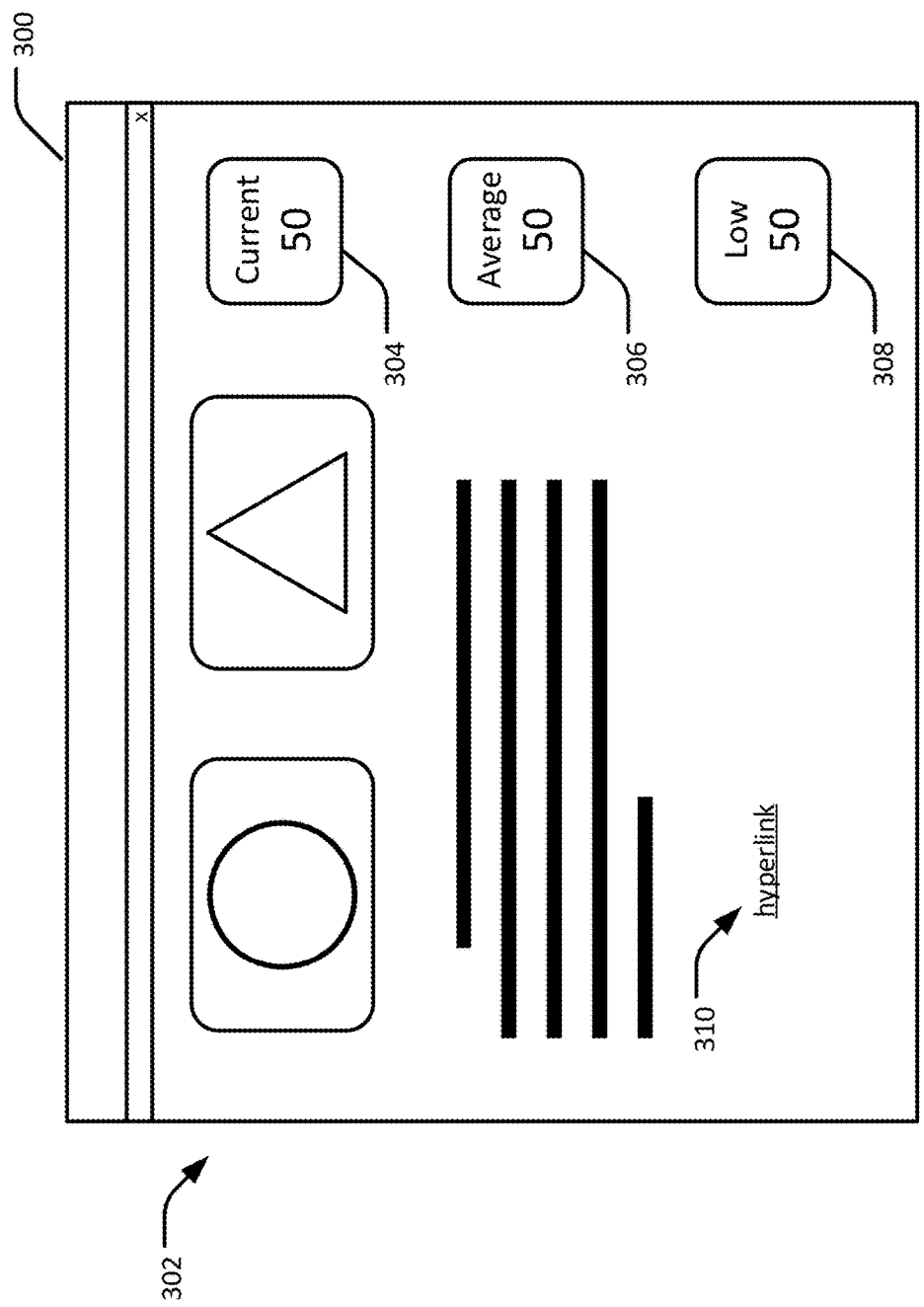
FIG. 3 is another example GUI for providing a visual indication of the application security threat awareness level, in accordance with an embodiment of the present disclosure.

FIG. 3 is another example GUI 300 for providing a visual indication of the security threat awareness level 130, in accordance with an embodiment of the present disclosure. The GUI 300 provides an output 302 of the active application 110 and multiple threat awareness overlays 304, 306, 308 that are superimposed over a portion of the output 302, such as shown. The threat awareness overlays 304, 306, 308 are visual indications representing one of a plurality of security threat levels corresponding to the security score of the active application 110, the open application 112a-n, and/or the security threat awareness level 130 for the client computing device 102. The threat awareness overlay 304 can, for example, include a numeric value corresponding to the current threat awareness level, such as high, m, or low, a numeric value corresponding to the current security score of the active application 110 and/or the open application 112a-n, and/or a numeric value corresponding to the security threat awareness level 130 for the client computing device 102. In some examples, the threat awareness overlay 304 can include a color icon alone or in combination with the numeric value(s), such as red for a high security threat level, yellow for a moderate security threat level, and green for a low security threat level. The threat awareness overlay 306 can, for example, include: a numeric value corresponding to the threat awareness level, such as high, moderate, or low; a numeric value corresponding to the average security score of the active application 110 and the open application 112a-n; and/or a numeric value corresponding to the average security threat awareness level 130 among active and open applications for the client computing device 102. In some examples, the threat awareness overlay 306 can include a color icon alone or in combination with the numeric value(s), such as red for a high security threat level, yellow for a moderate security threat level, and green for a low security threat level. The threat awareness overlay 308 can, for example, include a numeric value corresponding to the highest threat awareness level, such as high, moderate, or low, a numeric value corresponding to the lowest security score of the active application 110 and/or the open application 112a-n, and/or a numeric value corresponding to the lowest security threat awareness level 130 for the client computing device 102. In some examples, the threat awareness overlay 308 can include a color icon alone or in combination with the numeric value(s), such as red for a high security threat level, yellow for a moderate security threat level, and green for a low security threat level. By causing the GUI 300 to display the threat awareness overlays 304, 306, 308, the user can immediately see the visual indications and respond by taking actions to mitigate the security threat associated with the active application 110 and/or the open application 112a-n. For example, if any of the threat awareness overlays 304, 306, and/or 308 indicate a high security risk, the user can mitigate the risk by closing the active application 110 and/or the open application 112a-n, or by using the applications more carefully in conjunction with a prescribed policy to reduce the risk (such as by avoiding clicking on unverified or unfamiliar hyperlinks 310 in the output 302).

Example Security Score Classification Scheme

Figure 4:
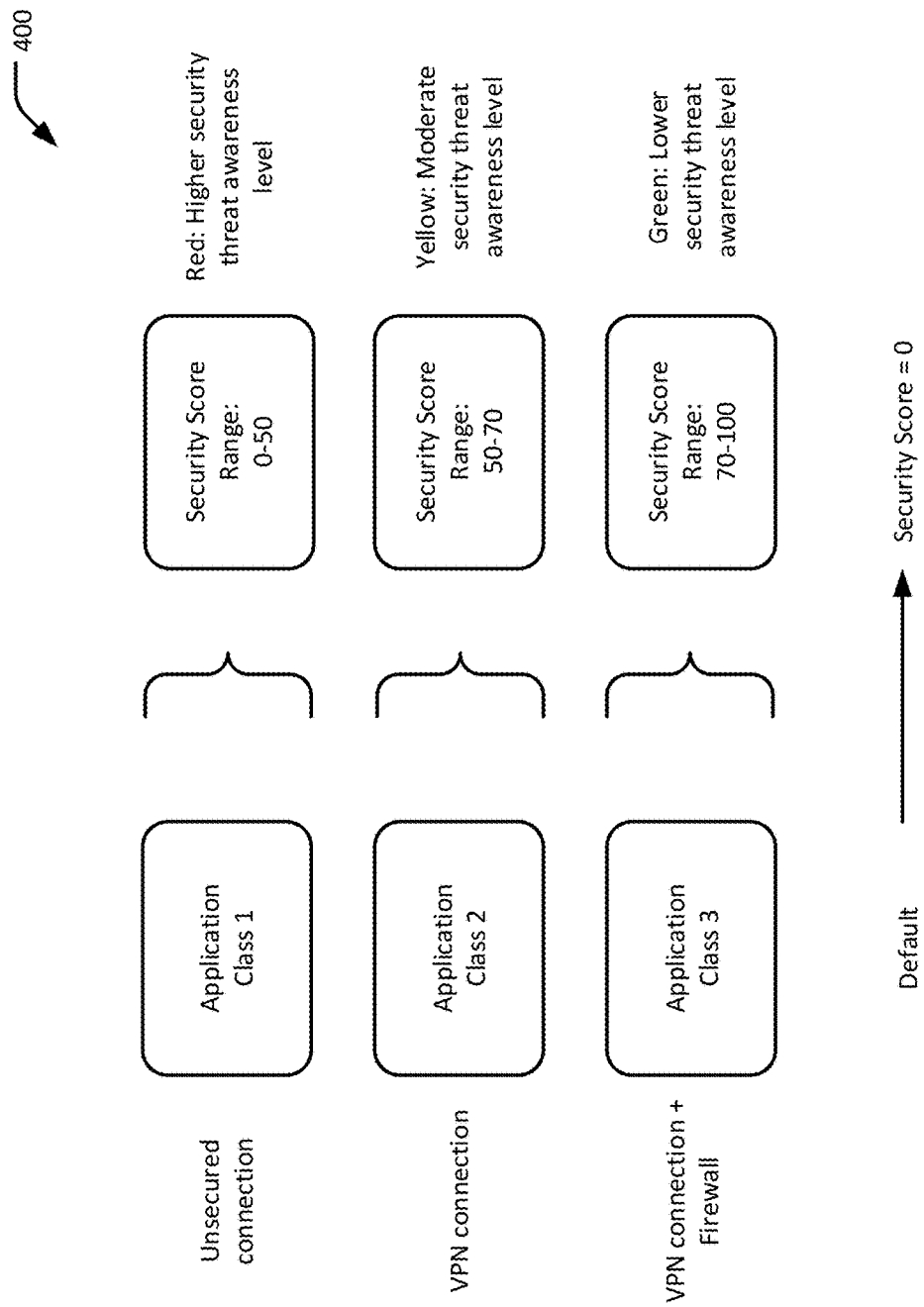
FIG. 4 is an example classification scheme for assigning security scores to applications, in accordance with an embodiment of the present disclosure.

FIG. 4 is an example classification scheme 400 for assigning security scores to applications, in accordance with an embodiment of the present disclosure. As noted above, the administrator 106 can assign security scores to the applications 110, 112a-n based on the security risk that the applications pose when executing on the remote computing device 102. For example, applications that use unsecured network connections can be assigned to Application Class 1 and have security scores in the range of 0-50, which represents a high security threat awareness level while those applications are executing on the client computing device 102. In another example, applications that use a VPN connection can be assigned to Application Class 2 and have security scores in the range of 50-70, which represents a moderate security threat awareness level while those applications are executing on the client computing device 102. In yet another example, applications that use a VPN connection in conjunction with a firewall can be assigned to Application Class 3 and have security scores in the range of 70-100, which represents a low security threat awareness level while those applications are executing on the client computing device 102. In some examples, each of the security threat awareness levels can be color coded in the visual indication to represent high (red), moderate (yellow), and low (green) security threat awareness levels.

In another example, the applications correspond to Software as a Service (SaaS) applications that can be enterprise-trusted, but not accessed via the enterprise. Instead, the SaaS applications are accessed directly from the client computing device 102. Nevertheless, the SaaS applications can be assigned to Application Class 3 and have security scores in the range of 70-100, which represents a low security threat awareness level while those applications are executing on the client computing device 102 due to being trusted by the enterprise. In yet another example, applications that are not assigned a security score receive a default security score of zero. In some examples, as noted above, the administrator 106 can configure certain applications as independent applications, which can include applications that are not executed through a web browser application.

Example Methodology for Providing Security Threat Awareness to a User

Figure 5:
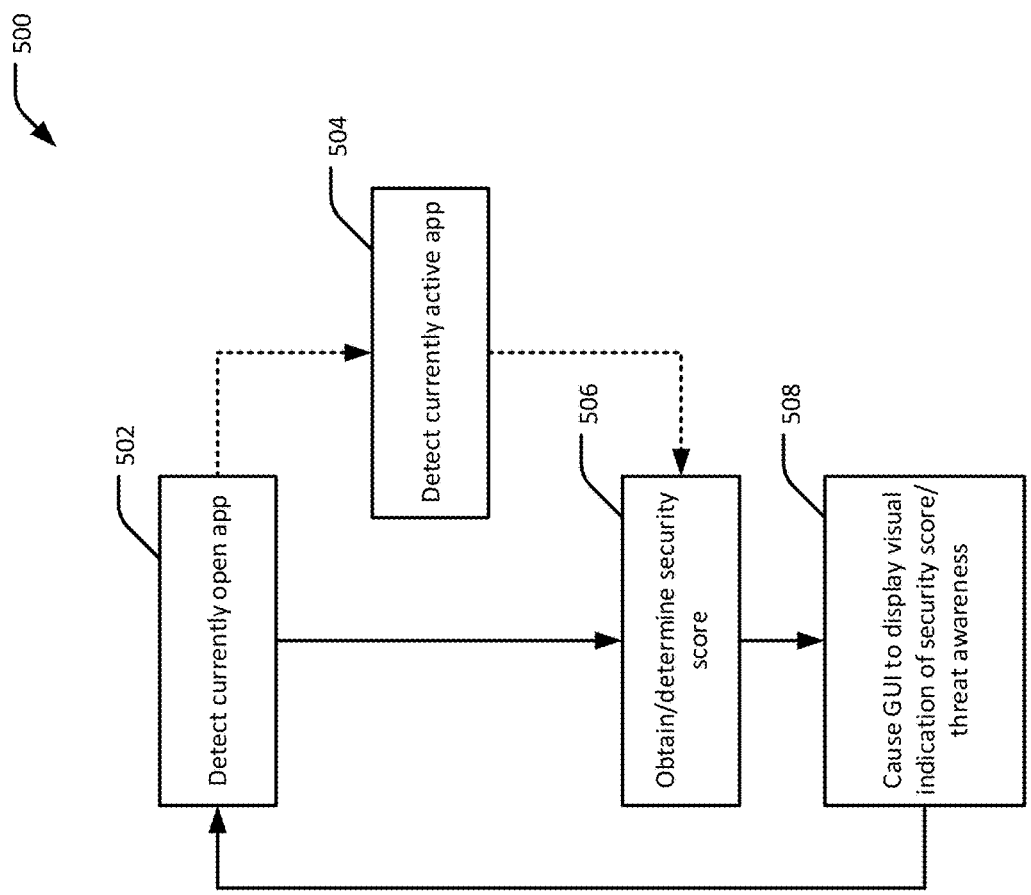
FIG. 5 is a block diagram of an example method for providing application security threat scores to a user, in accordance with an embodiment of the present disclosure.

FIG. 5 is a block diagram of an example method 500 for providing security threat awareness to a user, in accordance with an embodiment of the present disclosure. The method 500 can be implemented, for example, on the client computing device 102. As noted above, the client computing device 102 can execute one or more applications 110, 112a-n. The method 500 begins by detecting 502 a currently open application (for example, via the activity monitor 116 and the process table 114). An open application is any application that is currently executing on the client computing device 102. A process for detecting the currently open application is described with respect to FIG. 6.

The method 500 further includes obtaining 506 a security score associated with the currently open application (for example, via the threat overlay module 118 and the security score database 120). The security score, as described above, can be a numerical value between 0 and 100, which is assigned to the application by the administrator 106 and stored in the security score database 120, 124. For a given open application, the security threat awareness level 130 is the security score associated with the currently open application. The method 500 further includes causing 508 a GUI to display a visual indication of the security score and/or the security threat awareness level associated with the currently open application (via, for example, the threat overlay module 118). For example, if the security score of the currently open application is 20, then the GUI displays a threat awareness overlay 308 as a red color icon alone or in combination with the numeric value 20. By causing the GUI to display the threat awareness overlay, the user can immediately see the visual indication and respond by taking actions to mitigate the security threat associated with the currently open application. For example, if the threat awareness overlay indicates a high security risk, the user can mitigate the risk by closing the currently open application or by using the currently open application more carefully in conjunction with a prescribed policy to reduce the risk (such as by avoiding clicking on unverified or unfamiliar hyperlinks).

In some examples, the method 500 further includes detecting 504 a currently active application (via, for example, the activity monitor 116 and the process table 114). The active application 110 is the application currently in use by a user. For example, the active application is an application that is currently executing in the foreground of a user interface such that the user is able to directly interact with the application via the user interface. A process for detecting the currently active application is described with respect to FIG. 7. In these examples, the method 500 includes determining 506 the security score for the currently open application and/or the currently active application, if they are different applications, by calculating an average of the security scores and/or a lowest of the security scores for each of the currently open applications and the currently active applications. In this case, the visual indication represents at least one of the security threat awareness levels corresponding to the average security score or the lowest of the security scores. If the currently active application is an independent application, for example, not a browser-based application, there can be more than one currently active application. If the currently active application is independent, the security threat awareness level corresponds to the security score of the currently active application. If there is more than one currently active application, then the security threat awareness level corresponds to the average of the security scores for all of the currently active applications. If the currently active applications are non-independent (for example, browser-based applications), the security threat awareness level corresponds to the lowest security score among all the currently active applications.

In some examples, such as described with respect to FIG. 3, more than one visual indication can be displayed, such as the security score of the currently active or open application, the lowest security score of all active or open applications, and/or the average security score of all active or open applications. For example, consider where one currently active application is an independent virtual desktop application with a security score of 100 and another currently active application is a non-independent email application with a security score of 10 executing within the independent virtual desktop application. In this case, the visual indication represents the security threat level corresponding to the security score of 10 when the non-independent email application is the currently active application, and the visual indication represents the security threat level corresponding to the security score of 100 when the independent virtual desktop application is the currently active application. In another example, consider where one currently open application is a first non-independent email application with a security score of 70 and another currently open application is a second non-independent email application with a security score of 10. In this case, the visual indication represents the security threat level corresponding to the security score of 10 when either the first or second non-independent applications are the currently active application.

Figure 6:
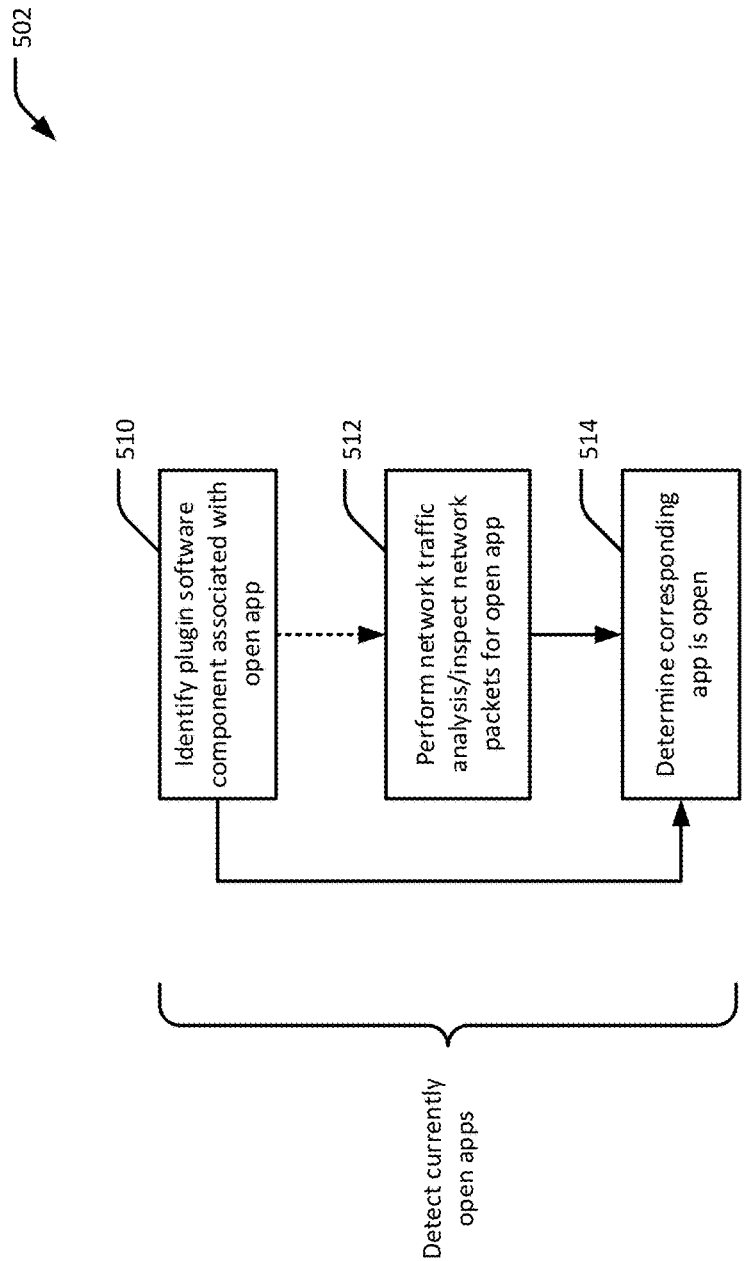
FIG. 6 is a block diagram of an example method for detecting a currently open application, in accordance with an embodiment of the present disclosure.

FIG. 6 is a block diagram of an example method 502 for detecting a currently open application, in accordance with an embodiment of the present disclosure. The method 502 includes identifying 510 a plugin software component associated with the open application in an operating system process table to determine 514 that the corresponding application is open. For example, if an entry for a file sharing plugin is listed in the process table, the corresponding file sharing application is determined to be open. In another example, if a browser is open, the browser application will be listed in the process table and therefore determined as being open. However, using a browser, multiple non-independent applications (for example, email applications, multimedia applications, etc.) can be open within the browser but not separately listed in the process table. So, for an in-depth identification of which non-independent applications are open, a network traffic analysis can be performed to identify the open applications based on network activity generated by those applications. In such cases, the method 502 further includes inspecting 512 network packets on a network connection associated with the open application for network activity generated by the open application to determine 514 that the corresponding application is open. Traffic analysis can be performed on the client computing device 102 by monitoring the initial few packets of the network connection and subjecting them to a deep packet inspection engine, such as commercially available deep packet inspection engines, to identify which non-independent applications are generating the network traffic and therefore can be determined to be open. For example, the traffic analysis can include capturing the service name indicators (such as http and https headers) or other application-specific signatures within inbound and outbound packets to determine the open and/or active application associated with those packets.

Figure 7:
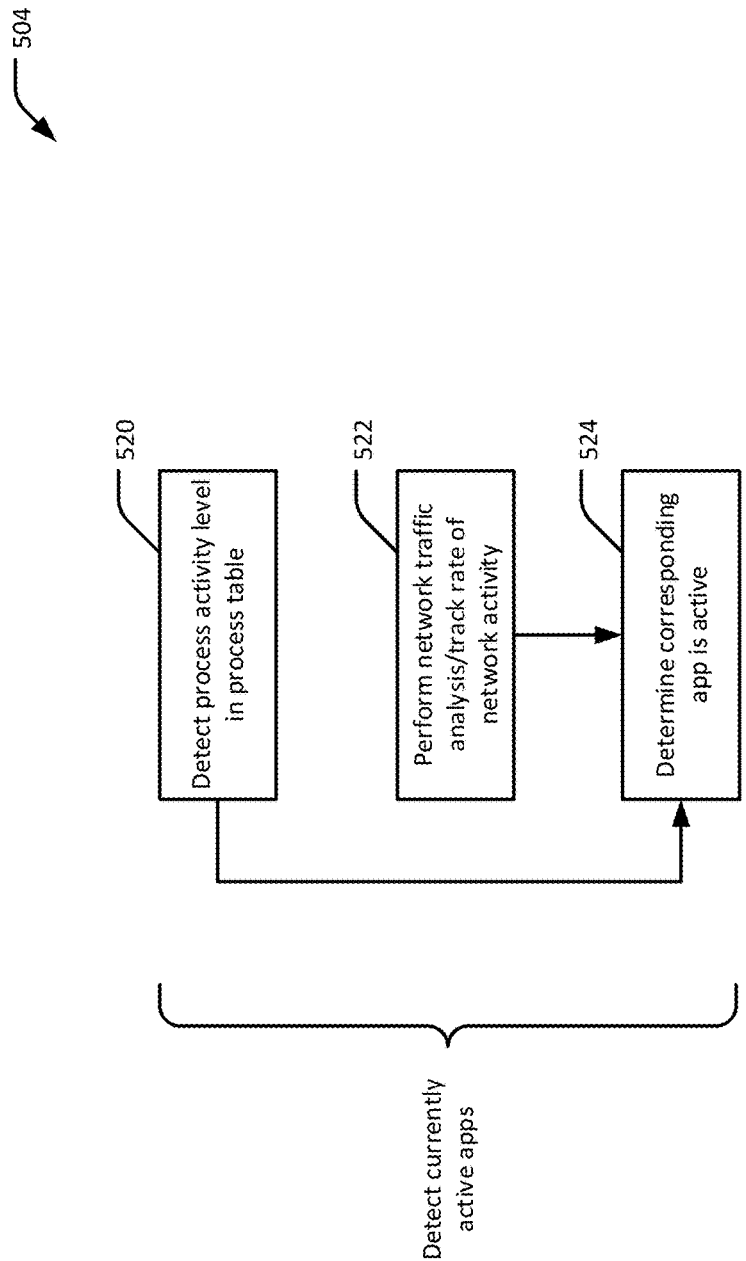
FIG. 7 is a block diagram of an example method for detecting a currently active application, in accordance with an embodiment of the present disclosure.

FIG. 7 is a block diagram of an example method 504 for detecting a currently active application, in accordance with an embodiment of the present disclosure. The method 504 includes detecting 520 a process activity level associated with an entry in an operating system process table of the client computing device. For example, if an entry for a file sharing plugin is listed in the process table, the corresponding file sharing application is determined 524 to be active if there is some above-threshold level of process activity associated with the application or if there is some input/output activity on the client computing device 102 associated with the application (such a via a keyboard). In another example, if a browser is open, the browser application will be listed in the process table and therefore determined as being open. However, using a browser, multiple non-independent applications (for example, email applications, multimedia applications, etc.) can be active within the browser but not separately listed in the process table. So, for an in-depth identification of which non-independent applications are active, a network traffic analysis can be performed to identify the active applications based on a rate or volume of network activity generated by those applications. In such cases, the method 502 further includes inspecting 522 network packets on a network connection associated with the active application for an above-threshold rate or volume of network activity generated by the active application to determine 524 that the corresponding application is active. Traffic analysis can be performed on the client computing device 102 by monitoring the number of packets on the corresponding network connection to identify which non-independent applications are generating the network traffic and therefore can be determined to be active.

Figure 8:
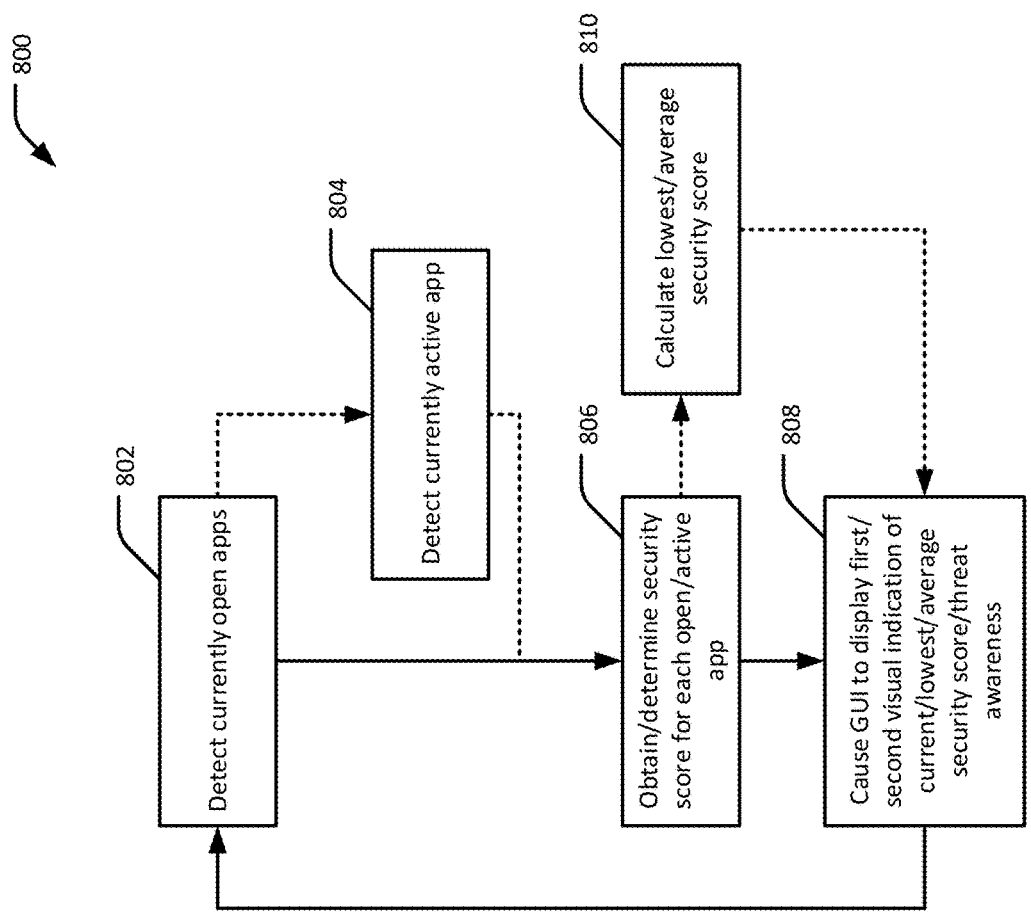
FIG. 8 is a block diagram of another example process for providing application security threat scores to a user, in accordance with an embodiment of the present disclosure.

FIG. 8 is a block diagram of another example process 800 for providing security threat awareness to a user, in accordance with an embodiment of the present disclosure. The method 800 can be implemented, for example, on the client computing device 102. As noted above, the client computing device 102 can execute one or more applications 110, 112a-n. The method 800 begins by detecting 802 a currently open application. An open application is any application that is currently executing on the client computing device 102. A process for detecting the currently open application is described with respect to FIG. 6. In some cases, the method 800 includes detecting 804 a currently active application. The active application is the application currently in use by a user. For example, the active application is an application that is currently executing in the foreground of a user interface such that the user is able to directly interact with the application via the user interface. A process for detecting the currently active application is described with respect to FIG. 7.

The method 800 further includes obtaining 806 a security score associated with the open application and/or the active application. The security score, as described above, can be a numerical value between 0 and 100, which is assigned to the application by the administrator 106 and stored in the security score database 120, 124. In some cases, the method 800 includes calculating 810 an average security score of all open and/or active applications, and/or calculating a lowest security score among all open and/or active applications.

The method 800 further includes causing 808 a graphical user interface of the client computing device to display a visual indication of the security score using a color and/or a numeric value, the visual indication representing at least one of a plurality of security threat levels corresponding to the security score. In some examples, such as described with respect to FIG. 3, more than one visual indication can be displayed, such as the security score of the currently active application, the lowest security score of all active applications, and/or the average security score of all active applications.

Example Computing Platform

Figure 9:
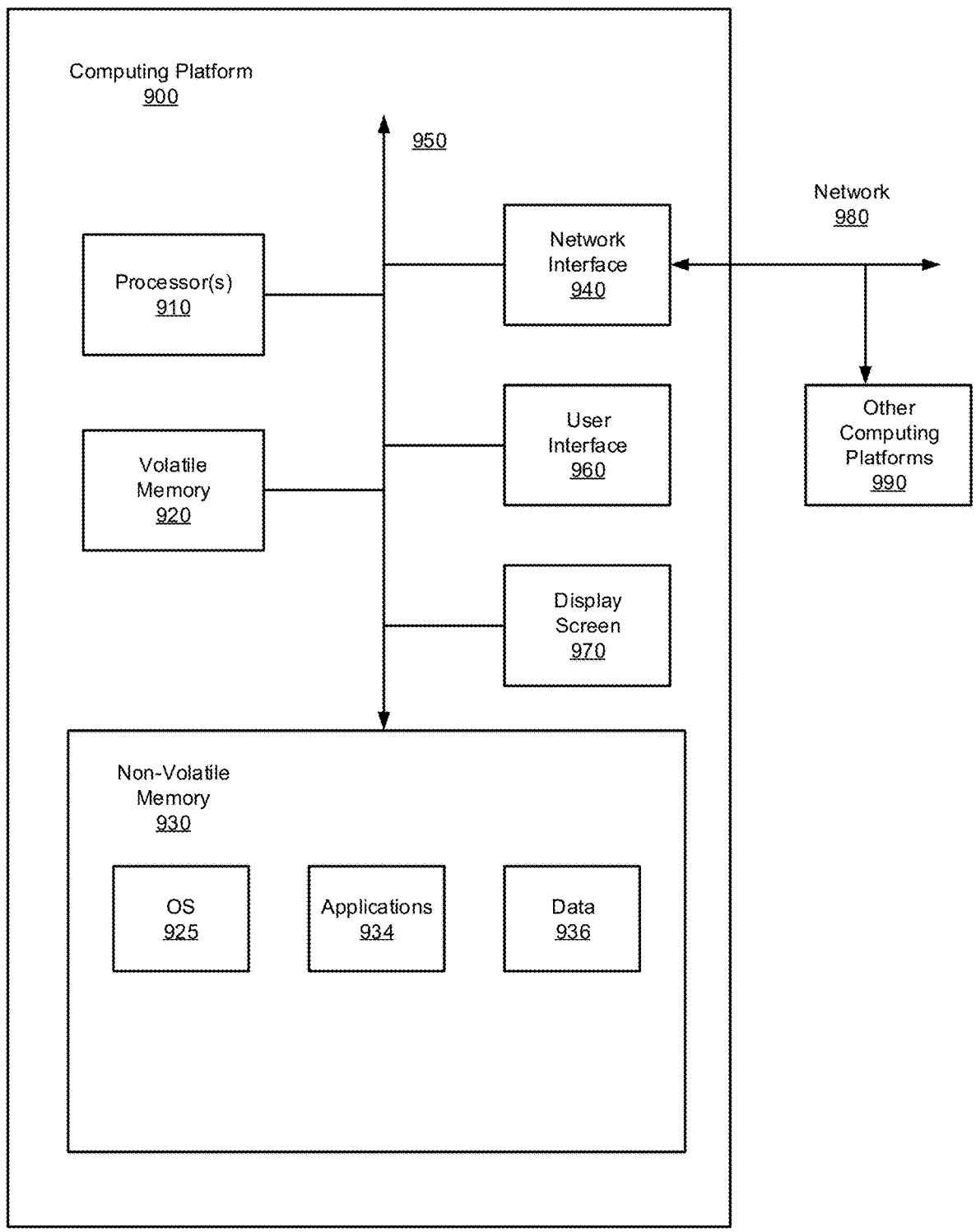
FIG. 9 is a block diagram of a computing platform configured to provide application security threat scores to a user, in accordance with an example of the present disclosure.

FIG. 9 is a block diagram of a computing platform 900 configured to provide security threat awareness to a user, in accordance with an example of the present disclosure. In some cases, the platform 900 may be a workstation, a laptop computer, a tablet, a mobile device, or any suitable computing or communication device.

The computing platform or device 900 includes one or more processors 910, volatile memory 920 (e.g., random access memory (RAM)), non-volatile memory 930, one or more network or communication interfaces 940, a user interface (UI) 960, a display screen 970, and a communications bus 950. The computing platform 900 may also be referred to as a computer or a computer system.

The non-volatile (non-transitory) memory 930 can include: one or more hard disk drives (HDDs) or other magnetic or optical machine-readable storage media; one or more machine-readable solid state drives (SSDs), such as a flash drive or other solid-state storage media; one or more hybrid machine-readable magnetic and solid-state drives; and/or one or more virtual machine-readable storage volumes, such as a cloud storage, or a combination of such physical storage volumes and virtual storage volumes or arrays thereof.

The user interface 960 can include one or more input/output (I/O) devices (e.g., a mouse, a keyboard, a microphone, one or more speakers, one or more biometric scanners, one or more environmental sensors, and one or more accelerometers, etc.).

The display screen 970 can provide a graphical user interface (GUI) and in some cases, may be a touchscreen or any other suitable display device.

The non-volatile memory 930 stores an operating system (OS) 925, one or more applications 934, and data 936 such that, for example, computer instructions of the operating system 925 and the applications 934, are executed by processor(s) 910 out of the volatile memory 920. In some examples, the volatile memory 920 can include one or more types of RAM and/or a cache memory that can offer a faster response time than a main memory. Data can be entered through the user interface 960. Various elements of the computer platform 900 can communicate via the communications bus 950.

The illustrated computing platform 900 is shown merely as an example computing device and can be implemented by any computing or processing environment with any type of machine or set of machines that can have suitable hardware and/or software capable of operating as described herein.

The processor(s) 910 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 910 can be analog, digital, or mixed. In some examples, the processor 910 can be one or more physical processors, which may be remotely located or local. A processor including multiple processor cores and/or multiple processors can provide functionality for parallel, simultaneous execution of instructions or for parallel, simultaneous execution of one instruction on more than one piece of data.

The network interfaces 940 can include one or more interfaces to enable the computing platform 900 to access a computer network 980 such as a Local Area Network (LAN), a Wide Area Network (WAN), a Personal Area Network (PAN), or the Internet through a variety of wired and/or wireless connections, including cellular connections. In some examples, the network 980 may allow for communication with other computing platforms 990, to enable distributed computing. In some examples, the network 980 may allow for communication with the one or more of the client computing device 102, the display 104, the administrator 106, and/or other parts of the network 108 of FIG. 1.

The foregoing description and drawings of various embodiments are presented by way of example only. These examples are not intended to be exhaustive or to limit the present disclosure to the precise forms disclosed. Alterations, modifications, and variations will be apparent in light of this disclosure and are intended to be within the scope of the present disclosure as set forth in the claims.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A method for providing security threat awareness to a user, the method comprising:
   detecting an open application executing on a client computing device based on a first entry in an operating system process table of the client computing device;

obtaining a first security score associated with the open application;

detecting an active application executing on the client computing device based on a second entry in the operating system process table, a volume of network traffic associated with the second entry, or both, the active application being different from the open application;

obtaining a second security score associated with the active application;

calculating an average security score of the first security score and the second security score, a lowest of the first security score and the second security score, or both; and causing a graphical user interface of the client computing device to superimpose a visual indication of at least one of the first security score the second security score, and the average security score over a portion of an output of the open application, a portion of an output of the active application, or both using a color, a numeric value, or both, the visual indication representing at least one of a plurality of security threat levels corresponding to the at least one of the first security score, the second security score, and the average security score;

wherein the visual indication further represents at least one of the security threat levels corresponding to the average security score or the lowest of the first security score and the second security score.

2. The method of claim 1, wherein the open application is a first open application, and the average security score is a first average security score, and wherein the method further comprises:

detecting a second open application executing on the client computing device based on a third entry in the operating system process table;

obtaining a third security score for the second open application; and calculating a second average security score of the first security score, the second security score, the third security score, a lowest of the first security score, the second security score, the third security score, or both, wherein the visual indication further represents at least one of the security threat levels corresponding to the second average security score or the lowest of the first security score, the second security score, and the third security score.

3. The method of claim 1, wherein the color is a first color, the numeric value is a first numeric value, and the visual indication is a first visual indication, and wherein the method further comprises causing the graphical user interface to display a second visual indication of the first security score, the second security score, or both using a second color, a second numeric value, or both.

4. The method of claim 1, wherein a plugin software component is associated with the open application, and wherein detecting the open application includes identifying the plugin software component in the operating system process table.

5. The method of claim 1, wherein detecting the open application includes inspecting network packets on a network connection associated with the open application for network activity generated by the open application.

6. The method of claim 1, wherein detecting the active application is further based on a process activity level associated with the second entry in the operating system process table.

7. The method of claim 1, wherein the active application is executing independently of the open application, and wherein the visual indication represents at least one of the security threat levels corresponding to the average security score.

8. The method of claim 1, wherein the active application is executing non-independently from the open application, and wherein the visual indication represents at least one of the security threat levels corresponding to the lowest of the first security score and the second security score.

9. A computer program product including one or more non-transitory machine-readable mediums having instructions encoded thereon that when executed by at least one processor cause a process to be carried out, the process comprising:

detecting an open application executing on a client computing device based on a first entry in an operating system process table of the client computing device;

obtaining a first security score associated with the open application;

detecting an active application executing on the client computing device based on a second entry in the operating system process table, a volume of network traffic associated with the second entry, or both;

obtaining a second security score associated with the active application;

calculating an average security score of the first security score and the second security score, a lowest of the first security score and the second security score, or both; and causing a graphical user interface of the client computing device to superimpose a visual indication of at least one of the first security score and the second security score over a portion of an output of the open application, a portion of an output of the active application, or both using a color, a numeric value, or both, the visual indication representing at least one of a plurality of security threat levels corresponding to the at least one of the first security score and the second security score, wherein the visual indication further represents at least one of the security threat levels corresponding to the average security score or the lowest of the first security score and the second security score.

10. The computer program product of claim 9, wherein the color is a first color, the numeric value is a first numeric value, and the visual indication is a first visual indication, and wherein the process further comprises causing the graphical user interface to superimpose a second visual indication of the first security score, the second security score, or both over a portion of an output of the open application, the portion of the output of the active application, or both using a second color and/or a second numeric value.

11. The computer program product of claim 9, wherein the active application is executing independently of the open application, and wherein the visual indication further represents at least one of the security threat levels corresponding to the average security score.

12. The computer program product of claim 9, wherein the active application is executing non-independently from the open application, and wherein the visual indication represents at least one of the security threat levels corresponding to the lowest of the first security score and the second security score.

13. The computer program product of claim 9, wherein the active application is a personal application, wherein the open application is a business application, and wherein the visual indication represents at least one of the security threat levels corresponding to the lowest of the first security score and the second security score.

14. The computer program product of claim 9, wherein detecting the active application includes inspecting network packets on a network connection associated with the active application for network activity generated by the active application.

15. A system comprising:
a storage; and
at least one processor operatively coupled to the storage, the at least one processor configured to execute instructions stored in the storage that when executed cause the at least one processor to carry out a process including detecting an open application executing on a client computing device based on a first entry in an operating system process table of the client computing device;
obtaining a first security score associated with the open application;
detecting an active application executing on the client computing device based on a second entry in the operating system process table, a volume of network traffic associated with the second entry, or both;
obtaining a second security score associated with the active application; and
calculating an average security score of the first security score and the second security score, a lowest of the first security score and the second security score, or both,
causing a graphical user interface of the client computing device to superimpose a visual indication of at least one of the first security score and the second security score over a portion of an output of the open application, a portion of an output of the active application, or both using a color, a numeric value, or both, the visual indication representing at least one of a plurality of security threat levels corresponding to the at least one of the first security score and the second security score,
wherein the visual indication further represents at least one of the security threat levels corresponding to the average security score or the lowest of the first security score and the second security score.

16. The system of claim 15, wherein the active application is a first active application and the average security score is a first average security score, and wherein the process further comprises:

detecting a second active application executing on the client computing device based on a third entry in the operating system process table;
obtaining a third security score for the second active application; and
calculating a second average security score of the first security score, the second security score, and the third security score, a lowest of the first security score, the second security score, and the third security score, or both,
wherein the visual indication further represents at least one of the security threat levels corresponding to the second average security score or the lowest of the first security score, the second security score, and the third security score.

17. The system of claim 15, wherein the color is a first color, the numeric value is a first numeric value, and the visual indication is a first visual indication, and wherein the process further comprises causing the graphical user interface to superimpose a second visual indication of the first security score, the second security score, or both over the portion of the output of the open application, the portion of the output of the active application, or both using a second color, a second numeric value, or both.

18. The system of claim 15, wherein a plugin software component is associated with the open application, and wherein detecting the open application includes identifying the plugin software component in the operating system process table.

19. The system of claim 15, wherein detecting the open application includes inspecting network packets on a network connection associated with the open application for network activity generated by the open application.

20. The system of claim 15, wherein:
if the active application is executing independently of the open application, then the visual indication represents at least one of the security threat levels corresponding to the average security score;
otherwise, the visual indication represents at least one of the security threat levels corresponding to the lowest of the first security score and the second security score.

* * * * *